United States Patent
Hsu et al.

(10) Patent No.: US 10,417,372 B2
(45) Date of Patent: Sep. 17, 2019

(54) ANNOTATING ISOLATED SIGNALS

(71) Applicant: Synopsys, Inc., Mountain View, CA (US)

(72) Inventors: Chih Neng Hsu, Zhudong Township (TW); Yaping Chen, Xiamen (CN)

(73) Assignee: Synopsys, Inc., Mountain View, CA (US)

( * ) Notice: Subject to any disclaimer, the term of this patent is extended or adjusted under 35 U.S.C. 154(b) by 73 days.

(21) Appl. No.: 14/952,443

(22) Filed: Nov. 25, 2015

(65) Prior Publication Data

US 2017/0147720 A1    May 25, 2017

(51) Int. Cl.
*G06F 17/50* (2006.01)

(52) U.S. Cl.
CPC ...... *G06F 17/5081* (2013.01); *G06F 17/5022* (2013.01); *G06F 17/5031* (2013.01); *G06F 17/5068* (2013.01); *G06F 2217/74* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 5,937,190 A * | 8/1999 | Gregory | .............. | G06F 17/5022 717/131 |
| 6,151,568 A * | 11/2000 | Allen | .................. | G06F 17/5022 703/14 |
| 7,137,078 B2 * | 11/2006 | Singhal | .................. | G06F 17/505 716/102 |
| 7,356,786 B2 * | 4/2008 | Schubert | .......... | G01R 31/31705 716/106 |
| 7,596,769 B2 * | 9/2009 | Chen | .................... | G06F 17/5022 716/109 |
| 7,739,629 B2 * | 6/2010 | Wang | .................... | G06F 17/505 703/14 |
| 7,761,834 B2 * | 7/2010 | McConaghy | ....... | G06F 17/5045 716/119 |
| 7,954,081 B2 * | 5/2011 | Bartley | ............. | H01L 23/49838 716/115 |
| 7,992,125 B2 * | 8/2011 | Chen | .................... | G06F 17/5022 716/132 |

(Continued)

OTHER PUBLICATIONS

E. Garat et al., "Unified Power Format (UPF) methodology in a vendor independent flow," 2015 25th Int'l Workshop on PATMOS, pp. 82-88.*

(Continued)

*Primary Examiner* — Leigh M Garbowski
(74) *Attorney, Agent, or Firm* — Park, Vaughan, Fleming & Dowler LLP; Laxman Sahasrabuddhe

(57) ABSTRACT

Systems and techniques for creating and displaying a circuit design view are described. A hardware description language (HDL) specification and a power intent specification of the circuit design can be analyzed to determine a correspondence between one or more signals in the HDL specification and one or more isolation cells in the power intent specification. The correspondence can be stored in a memory of a computer, and can be used for annotating a visual representation of a signal in a circuit design view based on a corresponding isolation cell. Next, the circuit design view with the annotated visual representation of the signal can be displayed.

9 Claims, 9 Drawing Sheets

(56) References Cited

U.S. PATENT DOCUMENTS

| | | | | |
|---|---|---|---|---|
| 8,176,453 | B2* | 5/2012 | Yang | G06F 17/5022 716/106 |
| 8,365,132 | B2* | 1/2013 | Hsu | G06F 17/5022 716/106 |
| 8,407,635 | B2* | 3/2013 | Chopra | G06F 17/504 703/16 |
| 8,434,051 | B2* | 4/2013 | Koyuncu | G06F 17/5045 716/100 |
| 8,479,132 | B2* | 7/2013 | Tsai | G06F 17/5022 716/111 |
| 8,516,422 | B1* | 8/2013 | Wang | G06F 17/505 703/16 |
| 8,683,419 | B1* | 3/2014 | Hines | G06F 17/505 716/109 |
| 8,762,906 | B2* | 6/2014 | Ginetti | G06F 17/5022 716/106 |
| 8,832,615 | B2* | 9/2014 | Hsieh | G06F 17/5009 716/106 |
| 8,893,065 | B2* | 11/2014 | Agarwala | G06F 17/5045 703/13 |
| 9,189,578 | B1* | 11/2015 | Giangarra | G06F 17/5009 |
| 9,201,994 | B1* | 12/2015 | Tripathi | G06F 17/5045 |
| 9,449,130 | B1* | 9/2016 | Kukal | G06F 17/5022 |
| 9,477,802 | B1* | 10/2016 | Ip | G06F 17/5081 |
| 9,524,366 | B1* | 12/2016 | Watanabe | G06F 17/505 |
| 2005/0044528 | A1* | 2/2005 | Olsen | G06F 11/3664 717/109 |
| 2014/0013293 | A1* | 1/2014 | Hsu | G06F 17/5022 716/133 |

OTHER PUBLICATIONS

V. Gourisetty et al., "Low Power Design Flow Based on Unified Power Format and Synopsys Tool Chain," 2013 IEEE Interdisciplinary Engineering Design Education Conference, pp. 28-31.*

A. Hazra et al., "Formal Verification of Architectural Power Intent," IEEE Trans. on VLSI Systems, vol. 21, No. 1, Jan. 2013, pp. 78-91.*

R. R. Kulkarni et al., "Energy Efficient Implementation, Power Aware Simualtion and Verification of 16-bit ALU using Unified Power Format Standards," 2014 Int'l COnference on Advanced Electronics, Computers and Communications (ICAECC), 6 pages.*

* cited by examiner

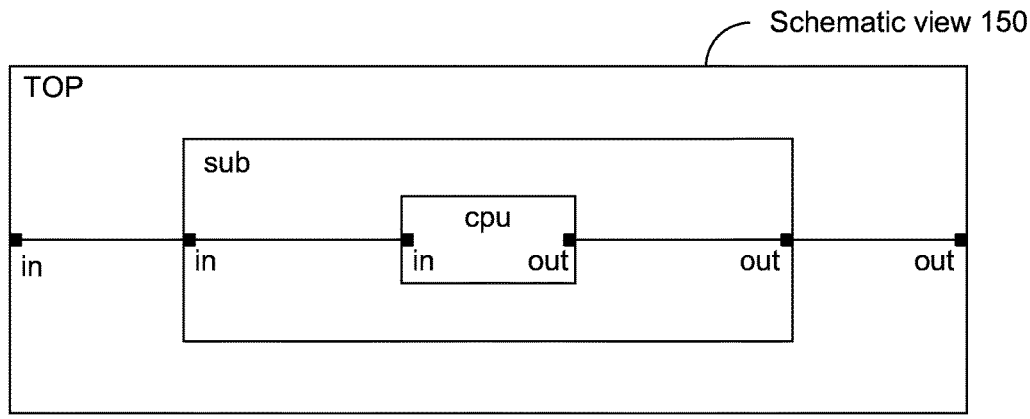

FIG. 1C

Power intent specification 200

202 {
set_design_top TOP
create_power_domain PD_TOP -include_scope

...

204 {
set_scope sub
create_power_domain PD_SUB -include_scope

...

206 {
set_isolation iso_sub -domain PD_SUB -elements {in} -applies_to inputs \
-location parent -isolation_signal ctr_sub -clamp_value 1

208 {
set_isolation iso_sub2 -domain PD_SUB -elements {out} -applies_to outputs \
-location parent -isolation_signal ctr_cpu -clamp_value 1

...

210 {
set_scope cpu
create_power_domain PD_CPU -include_scope

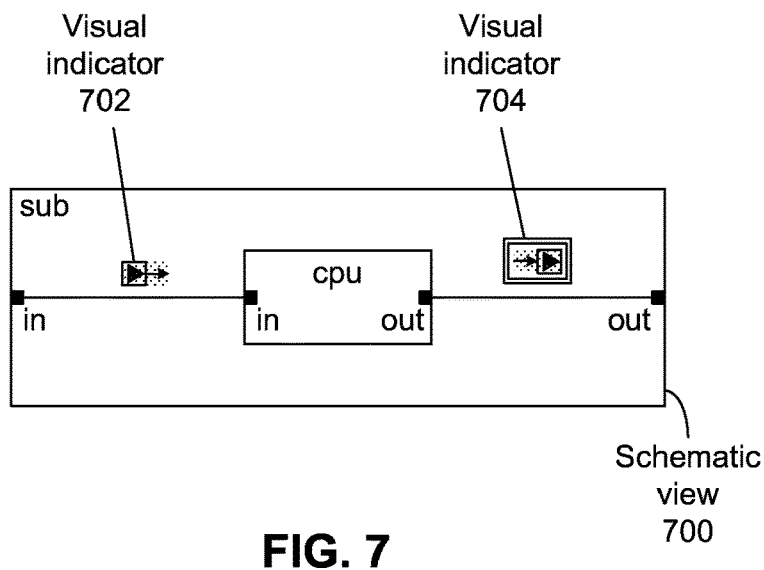

FIG. 7

Create a circuit design view of a circuit design that includes one or more GUI elements that visually convey information about an isolated signal and an isolation cell corresponding to the isolated signal
802

↓

Display the circuit design view
804

FIG. 8A

Analyze an HDL specification and a power intent specification to determine a correspondence between one or more signals in the HDL specification and one or more isolation cells in the power intent specification
812

↓

Annotate a visual representation of an isolated signal in the circuit design view based on a corresponding isolation cell
814

FIG. 8B

ANNOTATING ISOLATED SIGNALS

TECHNICAL FIELD

This disclosure relates to integrated circuit (IC) design. More specifically, this disclosure relates to annotating isolated signals in an IC design.

BACKGROUND

Related Art

Advances in process technology and a practically unlimited appetite for consumer electronics have fueled a rapid increase in the size and complexity of low power IC designs. What are needed are better tools for analyzing, understanding, and debugging low power IC designs.

IC designs are typically specified in a Hardware Definition Language (HDL), such as SystemVerilog. However, power intents, i.e., power aspects of a low power IC design, are typically specified separately, e.g., in a Unified Power Format (UPF) file or a Common Power Format (CPF) file. Signals that cross power domains often need to be controlled by isolation cells to ensure correct circuit behavior. The insertion of isolation cells and the connection of power domain crossing signals to isolation cells are done by Electronic Design Automation (EDA) tools. Depending on the UPF/CPF specifications (and other factors), power domain crossing signals may be connected to the input or the output of the inserted isolation cells.

SUMMARY

Some embodiments described in this disclosure annotate power domain crossing signals with visual indicators (e.g., marks) in source code view, schematic view, and/or waveform view to depict the relationships between power domain crossing signals and corresponding isolation cells. Furthermore, the visual indicators can show the states of the isolation cells, i.e., whether the isolation cell is enabled or disabled. These embodiments can help users quickly grasp the correct behavior of power domain crossing signals during design debugging and analysis.

Some embodiments described herein can analyze an HDL specification and a power intent specification of the circuit design to determine a correspondence between one or more signals in the HDL specification and one or more isolation cells in the power intent specification. In some embodiments, a circuit design representation can be created based on the HDL specification. Next, the power intent specification can be analyzed to identify one or more isolation cells, and connection tracing can be performed in the circuit design representation to determine the correspondence between signals in the circuit design and isolation cells. Once the correspondence between signals in the HDL specification and isolation cells in the power intent specification has been determined, the embodiments can annotate a visual representation of a signal in a circuit design view based on a corresponding isolation cell. The embodiments can then display the circuit design view.

In some embodiments, annotating the visual representation of the signal can comprise modifying at least one visually observable property of the visual representation of the signal. In some embodiments, a visual indicator that represents the corresponding isolation cell can be placed in proximity to the visual representation of the signal. In some embodiments, the visual indicator can additionally represent a state of the corresponding isolation cell. In some embodiments, the visual indicator can be automatically updated when the state of the corresponding isolation cell changes. In some embodiments, the visual indicator can be displayed in response to receiving a user selection input that selects the visual representation of the signal.

BRIEF DESCRIPTION OF THE FIGURES

FIG. 1C illustrates a schematic view corresponding to the HDL code illustrated in FIG. 1A in accordance with some embodiments described herein.

FIG. 2A illustrates a fragment of a power intent specification in accordance with some embodiments described herein.

FIG. 7 illustrates how a visual indicator corresponding to an isolation cell can be used in a schematic view in accordance with some embodiments described herein.

FIG. 8A illustrates a process for annotating an isolated signal in accordance with some embodiments described herein.

FIG. 8B illustrates a process for creating the circuit design view of the circuit design in accordance with some embodiments described herein.

DETAILED DESCRIPTION

Figure 1A:
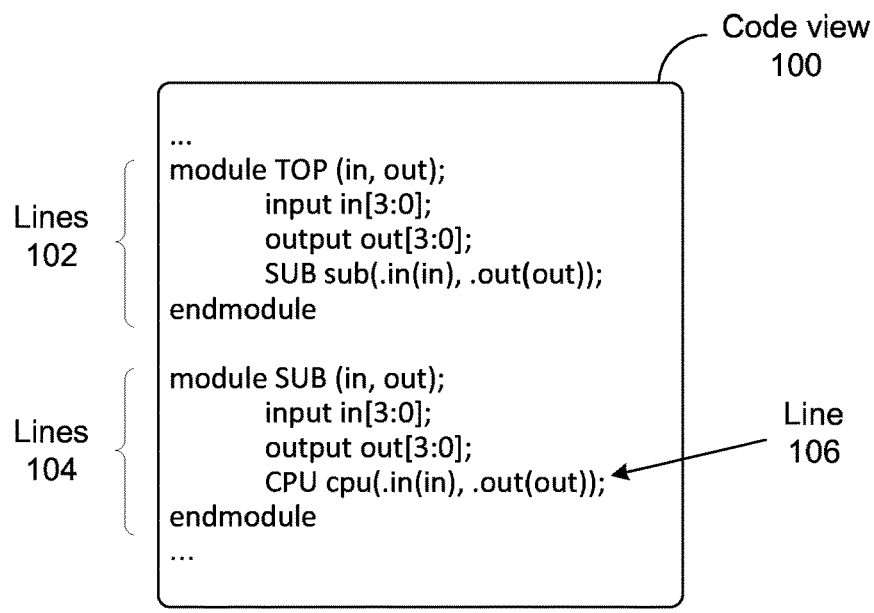
FIG. 1A illustrates an example of a code view of a circuit design in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of a Circuit Design Flow

The term "circuit design flow" refers to a sequence of steps that are performed to create a circuit design. Once the circuit design is finalized, it can undergo fabrication, packaging, and assembly to produce integrated circuit chips. A circuit design flow can include multiple steps, and each step can involve using one or more electronic design automation (EDA) software tools. Some circuit design steps and software tools are described below. These examples of circuit design steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design, the HDL (e.g., SystemVerilog) code can be written, and during functional verification the design can be checked for functional accuracy, e.g., the design can be checked to ensure that it produces the correct outputs. The power domain information can be specified separately from the HDL code, e.g., in one or more UPF or CPF files that are separate from the set of files that contain the HDL code.

During synthesis and design for test, the HDL code can be translated to a netlist using one or more EDA software tools. The insertion of isolation cells and the connection of power domain crossing signals to isolation cells can also be performed in this circuit design step. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

EDA tools typically enable a user to analyze, understand, and debug IC designs by using different types of IC design views (also referred to as circuit design views in this disclosure), e.g., code views (e.g., by displaying the HDL code for an IC design in an HDL editor), schematic views (e.g., by displaying a circuit schematic based on the HDL code of the IC design), waveform view (e.g., by displaying a plot of an input or output signal in the IC design against time by simulating the HDL code of the IC design), etc. These IC design views are typically generated based on the HDL code and lack power intent information. Some embodiments described herein annotate one or more IC design views by adding power intent information to the IC design views, thereby allowing users to better analyze, understand, and debug IC designs.

Circuit Design Views

In low power IC designs, circuitry is typically grouped into power domains. Power domains may be turned on or off, or run at different voltages, depending on the power mode that the design is currently operating in. The term "power domain crossing signals" refers to signals that cross power domains. One example of a power domain crossing signal is a signal that is carried on a wire that connects an output pin of a cell in power domain P1 and an input pin of another cell in power domain P2. Power domain crossing signals require special handing. In particular, if power domain crossing signals are not properly handled, then unexpected signal values from one power domain may be propagated to input pins in another power domain which can cause the IC design to behave incorrectly.

As mentioned above, power domain crossing signals connect circuitry in one power domain to circuitry in another power domain. In a conventional HDL specification, power domain crossing signals appear just like any other signal. In other words, it is not possible to identify which signals in a conventional HDL specification are power domain crossing signals. This is because a conventional HDL specification does not include power intent specifications that differentiate power domain crossing signals from other signals. As mentioned above, the power intent specification is conventionally provided separately from the HDL specification, e.g., the UPF or CPF files that specify the power intent (e.g., by using the "set_isolation" command) are separate from the HDL files.

An isolation cell can be inserted for a power domain crossing signal (the insertion of the isolation cell is the "special handling" that was alluded to above). The isolation cell can ensure correct behavior of the IC design by guaranteeing that unexpected signal values from one power domain do not propagate to input pins in another power domain. Once the isolation cell has been inserted, a power domain crossing signal can also be referred to as an "isolated signal."

Since the isolation cell has an input and an output, the isolated signal may refer to either the input side of the isolation cell or the output side of the isolation cell. The net name corresponding to the original power domain crossing signal is retained for the isolated signal, and a new system-created net name can be used for the connection on the other side of the isolation cell. For example, if the net name of the original power domain crossing signal is retained for the input side of the isolation cell, then the connection on the output side of the isolation cell can be given a new system-created net name, and vice versa.

Although the connection of the isolated signal to the input or output side of the isolation cell is deterministic with respect to the UPF/CPF specifications, it is not always clear to the IC designers. Furthermore, isolation cells use control signals to enable or disable them. Therefore, the state of the control signal can affect the behavior of the isolated signal. It will be beneficial to the IC designers if there is a visual cue that shows which side the isolated signal is connected to the isolation cell (input side or output side) and also the state of the control signal (enabled or disabled).

Figure 1B:
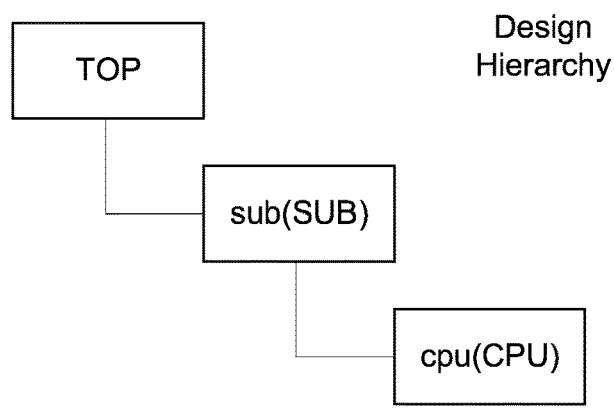
FIG. 1B illustrates a design hierarchy created by the HDL code illustrated in FIG. 1A in accordance with some embodiments described herein.

Traditionally, IC designers rely on different views for debugging/analyzing the IC design, such as source code views, schematic views and waveform views. FIG. 1A illustrates an example of a code view of a circuit design in accordance with some embodiments described herein. Code view 100 includes HDL lines 102 that define a module called "TOP," and HDL lines 104 that define a module called "SUB." Note that module "TOP" refers to instance "sub" of module "SUB" which, in turn, refers to instance "cpu" of a module called "CPU" as shown in HDL line 106. FIG. 1B illustrates a design hierarchy created by the HDL code illustrated in FIG. 1A in accordance with some embodiments described herein. FIG. 1C illustrates a schematic view corresponding to the HDL code illustrated in FIG. 1A in accordance with some embodiments described herein. Schematic view 150 illustrates that a block labeled "TOP" includes a block labeled "sub" which, in turn, includes a block labeled "cpu." Schematic view 150 also illustrates that the input pin of "TOP" is connected to the input pin of "sub" which is connected to the input pin of "cpu," and that the output pin of "TOP" is connected to the output pin of "sub" which is connected to the output pin of "cpu." Code view 100 and schematic view 150 may be displayed to a user using a graphical user interface (GUI).

Power Intent Specification

FIG. 2A illustrates a fragment of a power intent specification in accordance with some embodiments described herein. Code lines 202, 204, and 210 create power domains called "PD_TOP," "PD_SUB," and "PD_CPU," respectively. Power domains "PD_TOP," "PD_SUB," and "PD_CPU" correspond to module TOP, module instance "sub," and module instance "cpu," respectively. Code lines 206 and 208 indicate that isolation cells "iso_sub" and "iso_sub2" are to be inserted for pin "in" of module instance "sub" and pin "out" of module instance "sub," respectively.

In conventional EDA tools, the HDL code shown in FIG. 1A and the power intent specification shown in FIG. 2A are provided separately, e.g., in separate files. Even if these specifications were provided in a single file, they are usually treated as separate pieces of information by conventional EDA tools. Specifically, in conventional EDA tools, the code views, schematic views, and waveform views of the circuit design only display information contained in the HDL code. Circuit design views that are generated by conventional EDA tools do not contain visual elements that are based on the information contained in the power intent specification. In contrast to conventional EDA tools, some embodiments described herein generate code views, schematic views, and waveform views of the circuit design that contain visual elements that are based on the information contained in both the HDL code and the power intent specification.

The HDL code for a circuit design can describe the connectivity between circuit objects in the circuit design. The power intent specification can describe where isolation cells are to be inserted in the circuit design. Embodiments described herein can create a representation of the circuit design in a memory of a computer based on the HDL code and the power intent specification.

Figure 2B:
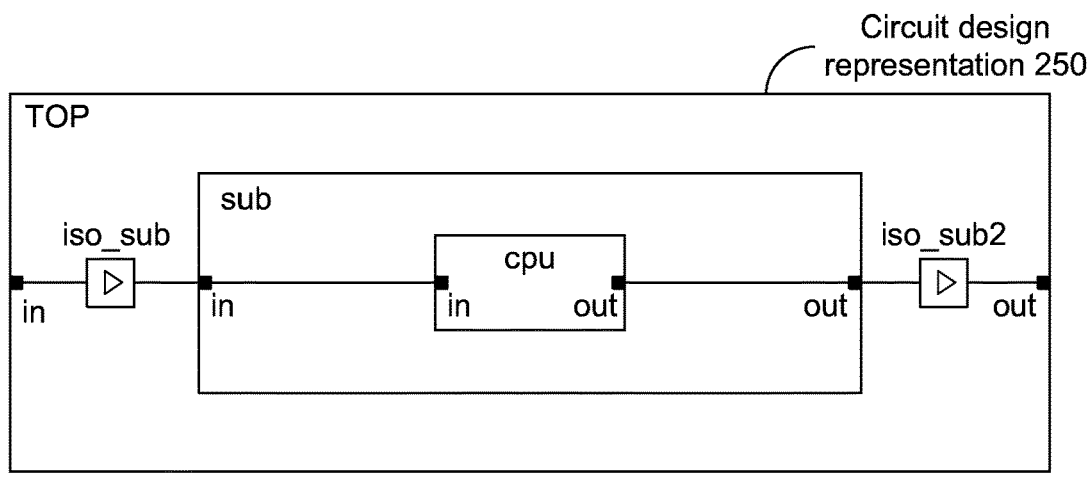
FIG. 2B illustrates how the HDL code shown in FIG. 1A and the power intent specification shown in FIG. 2A can be used to create a circuit design representation in accordance with some embodiments described herein.

FIG. 2B illustrates how the HDL code shown in FIG. 1A and the power intent specification shown in FIG. 2A can be used to create a circuit design representation in accordance with some embodiments described herein. In circuit design representation 250, two isolation cells called "iso_sub" and "iso_sub2" have been inserted, and the isolation cells have been connected to signals sub/in (i.e., the pin "in" in module instance "sub") and sub/out (i.e., the pin "out" in module instance "sub"), respectively. Note that the isolation cells have been inserted in module "TOP" which is the parent of module instance "sub" because code lines 206 and 208 included the option "-location parent."

Each circuit object in the circuit design can correspond to a software object (which is stored in the memory of the computer) in the circuit design representation, e.g., module instances "cpu" and "sub" shown in FIG. 2B can correspond to software objects in circuit design representation 250. The circuit design representation also contains information about the connectivity of circuit objects. For example, the circuit design representation can include a software object (which may correspond to a net) that connects a pin of one circuit object (e.g., pin "in" of module instance "sub") with a pin of another circuit object (e.g., pin "in" of module instance "cpu").

Some embodiments described herein can trace the connectivity of an isolation cell to determine the circuit elements that the isolation cell is connected to. For example, in circuit design representation 250, the embodiments can trace the connectivity of the isolation cells to determine that signal sub/in is connected to the output end of isolation cell "iso_sub" and signal sub/out is connected to the input end of isolation cell "iso_sub2." Conventional EDA tools do not show this connectivity in code view or waveform view. In contrast, some embodiments described herein can provide visual cues in code views and waveform views of a circuit design based on this connectivity information.

Annotating Isolated Signals

Figure 3:
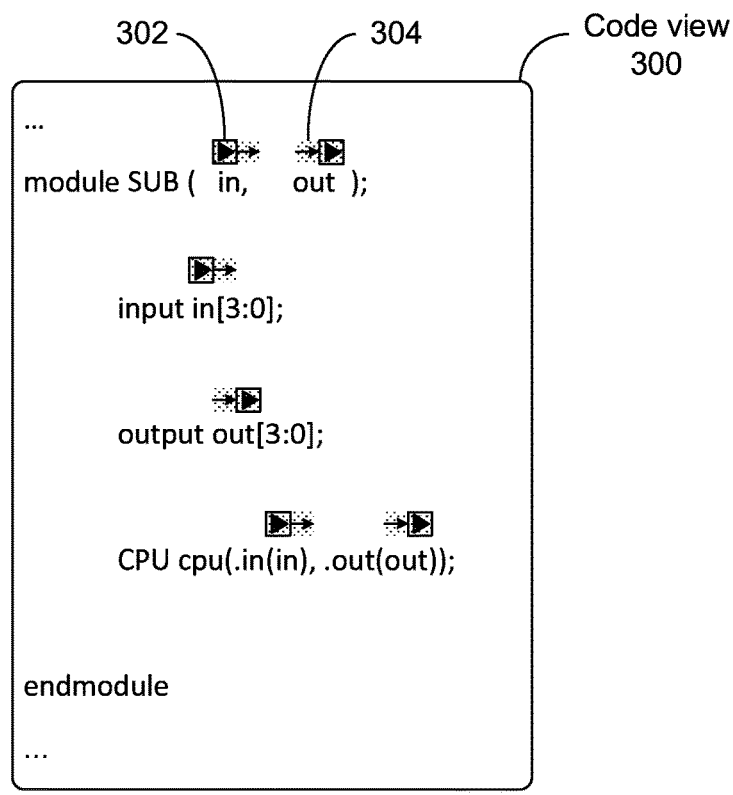
FIG. 3 illustrates how a visual indicator based on power intent information can be provided in a code view in accordance with some embodiments described herein.

FIG. 3 illustrates how a visual indicator based on power intent information can be provided in a code view in accordance with some embodiments described herein. In code view 300, two markers have been used to annotate signals "in" and "out" in module SUB to indicate the connection directions to the respective isolation cells. The marker 302 placed in proximity of "in" shows that the connection is made to the output side of the isolation cell, and the marker 304 placed in proximity of "out" shows that the connection is to the input side of the isolation cell. When some embodiments described herein parse the HDL code, they can identify the signals. Specifically, the syntax of the HDL can specify which tokens in the HDL code correspond to signals (the term "token" refers to a string of characters that forms a syntactic unit). Next, the embodiments can use the circuit design representation (e.g., circuit design representation 250) to identify which signals are connected to isolation cells by tracing the connectivity of the isolation cells as described above. The embodiments can then place a visual indicator (e.g., markers 302 and 304) corresponding to an isolation cell in proximity to each one of the one or more occurrences of the isolated signal in a code view of the circuit design.

Figure 4:
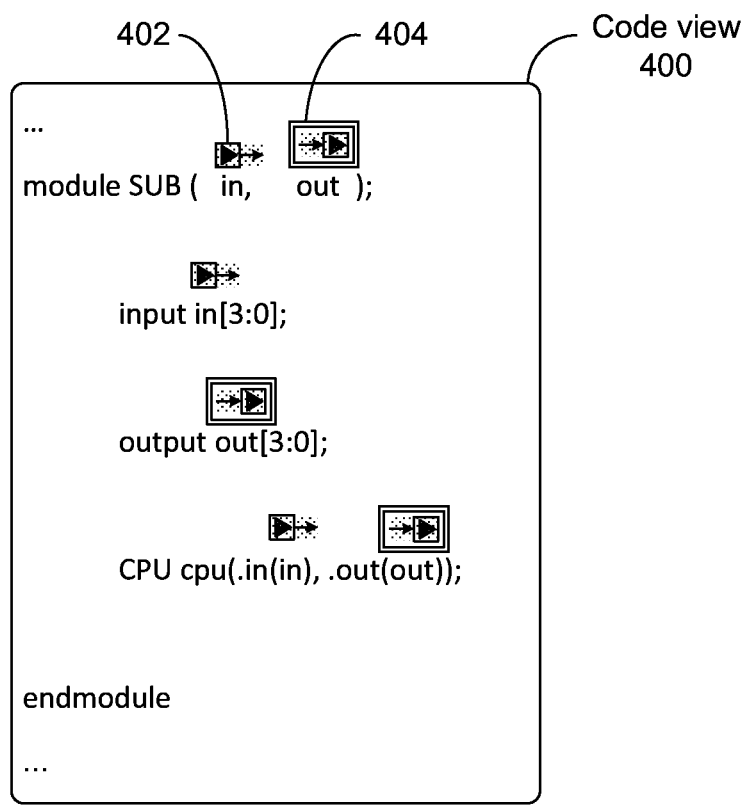
FIG. 4 illustrates how a visual indicator corresponding to a state of an isolation cell can be provided during simulation in accordance with some embodiments described herein.

FIG. 4 illustrates how a visual indicator corresponding to a state of an isolation cell can be provided during simulation in accordance with some embodiments described herein. During simulation, or during post-simulation with a dump file loaded, current signal values of "in" and "out", and the states of the respective isolation cells (e.g., disabled or enabled) can be retrieved from the simulator or from the dump file. In general, any visual indicator can be used to indicate the state of an isolation cell, e.g., the markers corresponding to isolation cells can be modified by changing a visual property of the marker (e.g., foreground color, background color, line width, shading, etc.), by adding an additional visual indicator to the existing marker to indicate the state of the corresponding isolation cell, or by having different visual indicators for enabled and disabled isolation cells. For example, code view 400 shows that the isolation cell connected to signal "in" is disabled (the marker is not surrounded by a double-line rectangle) whereas the isolation cell connected to signal "out" is enabled (the marker is surrounded by a double-line rectangle).

In general, an isolated signal can be annotated by placing a visual indicator in proximity to the isolated signal, wherein the visual indicator can enable a user to distinguish between the following four possibilities: (1) the isolated signal is connected to the input side of an isolation cell and the isolation cell is currently disabled, (2) the isolated signal is connected to the input side of the isolation cell and the isolation cell is currently enabled, (3) the isolated signal is connected to the output side of the isolation cell and the isolation cell is currently disabled, and (4) the isolated signal is connected to the output side of the isolation cell and the isolation cell is currently enabled.

Whether an isolated signal is connected to the input side or the output side of a respective isolation cell can be determined by using one of the following two ways: (1) analyzing the source code files and power intent (such as UPF/CPF) files, or (2) querying the simulator. Techniques for analyzing the source code file and power intent files to determine the connectivity of an isolated signal (e.g., whether the isolated signal is connected to the output or input of the isolation cell), and techniques for querying a simulator to obtain this information are known in the art.

Whether an isolation cell is disabled or enabled can be determined by analyzing the source code files and power intent files to obtain the control signal names and then querying the dump file or the simulator for the values of the control signals. For example, lines 206 and 208 in FIG. 2A indicate that the control signals "ctr_sub" and "ctr_cpu" are used to control isolation cells "iso_sub" and "iso_sub2," respectively. Using the control signal values (e.g., values of "ctr_sub" and "ctr_cpu" from the dump files or by querying the simulator) and the analysis of the power intent files, one can readily determine the enabling state of each isolation cell.

Figures 5, 6:
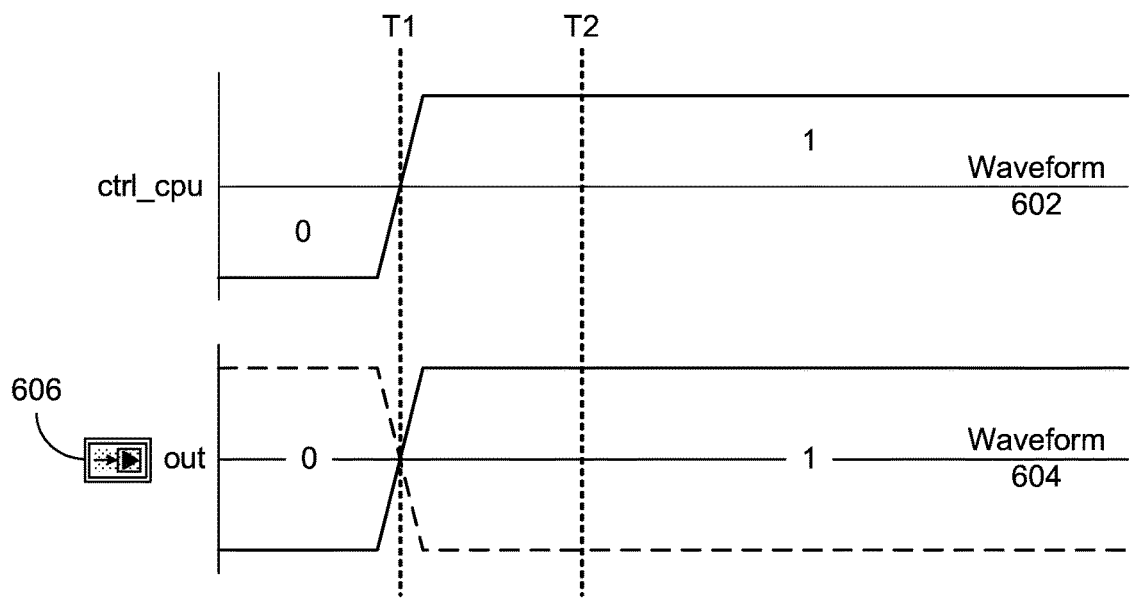
FIG. 5 illustrates how visual indicators corresponding to isolation cells can be used to analyze or debug a circuit design in accordance with some embodiments described herein.
FIG. 6 illustrates how a visual indicator corresponding to an isolation cell can be used in a waveform view in accordance with some embodiments described herein.

FIG. 5 illustrates how visual indicators corresponding to isolation cells can be used to analyze or debug a circuit design in accordance with some embodiments described herein. Code view 500 includes two X's 502 in proximity to isolated signals "in" and "out." Using an "X" next to a signal name is commonly known as "active annotation" in the HDL source code views, which shows that the current value of the signal "in" is "X" (i.e., unknown) and the current value of the signal "out" is also "X" (i.e., unknown). Other values that may be displayed in proximity to a signal are "0" and "1." In general any visual indicator can be used to indicate a current value of an isolated signal.

As shown in FIG. 5, the isolation marker corresponding signal "in" shows that signal "in" is connected to the output end of an isolation cell, and that the isolation cell is disabled. The fact that the isolation cell is disabled is probably the reason why signal "in" has an unknown value. If the value of signal "in" shouldn't be X, then the user might want to check the control signal of the isolation cell to see why the isolation cell is disabled when it shouldn't be.

Likewise, the visual indicator on signal "out" shows that signal "out" is connected to the input side of the isolation cell, and that the isolation cell is currently enabled. If the value of signal "out" shouldn't be "X," then it might be that signal "out" is not properly connected to the output side of the isolation cell. Therefore, in this case, the user might want to check the power intent specification to see why the connection is not made to the output side of the isolation cell.

These two examples demonstrate that, without the visual indicators corresponding to the isolation cells, the user would not be able to quickly understand that a possible reason why a signal (e.g., signals "in" and "out") has an incorrect value (e.g., "X") is because of the state of the isolation cell (e.g., disabled or enabled). Specifically, without the visual indicators corresponding to the isolation cells and their respective states, users may have to look at several places to determine the root causes of the behavior of isolated signals.

FIG. 6 illustrates how a visual indicator corresponding to an isolation cell can be used in a waveform view in accordance with some embodiments described herein. Waveforms 602 and 604 correspond respectively to signals "ctrl_cpu" (which controls an isolation cell) and "out" (which is the signal connected to the output side of the isolation cell). At the time T1 indicated by the vertical dotted line, signal "ctrl_cpu" has a transition from 0 to 1, and signal "out" has also a transition from 0 to 1 (signal "out" is a differential signal, so waveform 604 shows two transitions—one differential signal transitions from 0 to 1 and the other differential signal transitions from 1 to 0). When signal "ctrl_cpu" is provided to the isolation cell, and the signal becomes a "1," the isolation cell controlled by the signal is "enabled." The visual indicator 606 in front of signal "out" indicates just that. It shows that signal "out" is connected to the output side of the isolation cell, and that currently the isolation cell is enabled. Since the isolation cell is enabled and signal "out" is connected to the output side, signal "out" gets the clamp value of the isolation cell at that time (i.e. "1"). Note that the clamp value is specified in the power intent specification, e.g., see lines 206 and 208 in FIG. 2A.

In some embodiments, the system can determine the value of the control signal of an isolation cell, and display a corresponding visual indicator (e.g., visual indicator 606) to visually indicate the state of the isolation cell at a user selected time, e.g., at time T2. Note that a user can view waveform 604 and determine whether or not an isolation cell is working as desired. Any deviance from the expected behavior can alert the user to a problem. Specifically, a user can quickly identify a problem in the circuit design by comparing the value of signal "out" and the state of the isolation cell (which is indicated by visual indicator 606). For example, if the value of signal "out" was a "0" at time T2, the user would immediately know that there is a problem because the isolation cell is not clamping the output value to a "1" even though the control signal to the isolation cell has activated the isolation cell (this is because visual indicator 606 would indicate that the isolation cell has been activated). In the absence of the visual indicator corresponding to the isolation cell and its current state, a user would have to figure out that signal "ctrl_cpu" controls the clamped value of signal "out," then plot the waveforms of these two signals, and finally compare the two waveforms to determine whether or not there was a problem in the behavior of the isolation cell.

FIG. 7 illustrates how a visual indicator corresponding to an isolation cell can be used in a schematic view in accordance with some embodiments described herein. Schematic view 700 shows a schematic view of module instance "sub" in the circuit design. Visual indicators 702 and 704 show that signal "in" is connected to the output side of an isolation cell which is disabled, and signal "out" is connected to the input side of another isolation cell which is enabled. Note that the isolation cells are inserted in the TOP block as shown in FIG. 1C. However, some embodiments described herein can determine that signals "in" and "out" are connected to the isolation cells by tracing the connectivity in the circuit design representation. In the absence of visual indicators 702 and 704 corresponding to the isolation cells and their current states, a user would not know that signals "in" and "out" were connected to isolation cells.

FIG. 8A illustrates a process for annotating an isolated signal in accordance with some embodiments described herein. The process can begin with creating a circuit design view (e.g., code view, waveform view, and/or a schematic view) of a circuit design that includes one or more GUI elements that visually convey information about an isolated signal and an isolation cell corresponding to the isolated signal (operation 802). Next, the process can display the circuit design view (operation 804).

FIG. 8B illustrates a process for creating the circuit design view of the circuit design in accordance with some embodiments described herein. The process can begin by analyzing an HDL specification and a power intent specification to determine a correspondence between one or more signals in the HDL specification and one or more isolation cells in the power intent specification (operation 812). Next, the process can annotate a visual representation of a signal in the circuit design view based on a corresponding isolation cell (operation 814).

Annotating a visual representation of an isolated signal can generally involve modifying or adding GUI elements to visually convey information about an isolation cell that corresponds to the isolated signal. For example, a color, a font, or any other visually observable property of the visual representation of the isolated signal may be modified to visually convey information of the isolation cell that corresponds to the isolated signal. Alternatively or additionally, a visual indicator that corresponds to the isolation cell (and that optionally corresponds to the state of the isolation cell) may be placed in proximity to the visual representation of the isolated signal (e.g., as described in FIGS. 3-7 and the associated text of the instant application). In some embodiments, the visual indicator may be displayed in response to receiving a user selection input that selects the visual representation of the isolated signal, e.g., the user selection input can correspond to a user moving a cursor over the visual representation of the signal. In code view 300 (see FIG. 3), for example, visual indicator 302 may be displayed only when a user moves a cursor over the signal "in." When the cursor is moved away from the signal "in," visual indicator 302 may be automatically removed from code view 300. Note that, in some embodiments described herein, a visual indicator can show the state of a corresponding isolation cell, and the visual indicator can be automatically updated (e.g., by changing the color of the visual indicator) as the state of the isolation cell changes, e.g., during a simulation run or when analyzing a simulation dump file.

Figure 8C:
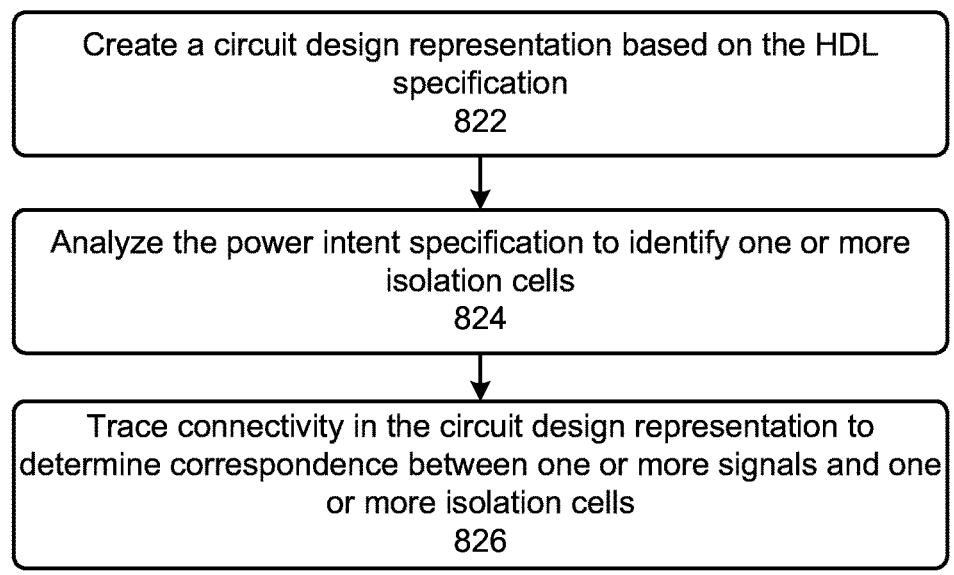
FIG. 8C illustrates a process for analyzing an HDL specification and a power intent specification in accordance with some embodiments described herein.

FIG. 8C illustrates a process for analyzing an HDL specification and a power intent specification in accordance with some embodiments described herein. The process can begin with creating a circuit design representation based on the HDL specification (operation 822). The circuit design representation can be created in a memory of a computer. Next, the process can analyze the power intent specification to identify one or more isolation cells (operation 824). The process can then trace connectivity in the circuit design representation to determine correspondence between one or more signals and one or more isolation cells (operation 826). Specifically, when the process traces connectivity, it can determine the signal names corresponding to the wires or nets in the circuit design representation that are connected to an isolation cell's input or output. Next, the process can store this correspondence between the signal names and the isolation cells in the memory of the computer, e.g., the process can store the name of an isolation cell in a field of a data structure that corresponds to a signal. The process can then use the correspondence to determine where to place the visual indicators for the isolation cells.

Although the HDL specification describes a circuit design, additional circuit elements (e.g., isolation cells) can be inserted into the circuit design based on information that is extraneous to the HDL specification (e.g., the power intent specification). Circuit design views, e.g., code views, waveform views, and schematic views are typically created based only on the HDL specification. Therefore, these circuit design views do not include the extraneous information, even though the extraneous information impacts how the circuit design behaves.

In contrast to conventional approaches, some embodiments described herein can be used to modify or add GUI elements to circuit design views based on such extraneous information. Specifically, GUI elements (e.g., a signal name in a code view or a waveform view, or a line corresponding to a signal in a schematic view) in one or more circuit design views can be annotated by modifying the GUI elements (e.g., by changing their color, font, line width, etc.) or by adding additional GUI elements in proximity to the existing GUI elements to visually convey information that (1) is extraneous to the information that is present in the HDL code and (2) is important for understanding how the circuit design works.

Specifically, some embodiments can receive an HDL specification for a circuit design that provides structural information of the circuit design. Next, the embodiments can receive additional structural information (e.g., location of isolation cells) of the circuit design that is extraneous to the HDL specification. The embodiments can then use the additional structural information to annotate a circuit design view that includes GUI elements corresponding to structural information present in the HDL specification (e.g., by annotating code views, waveform views, and schematic views). Next, the embodiments can display the annotated circuit design view that includes both the structural information present in the HDL specification and the additional structural information.

Figure 9A:
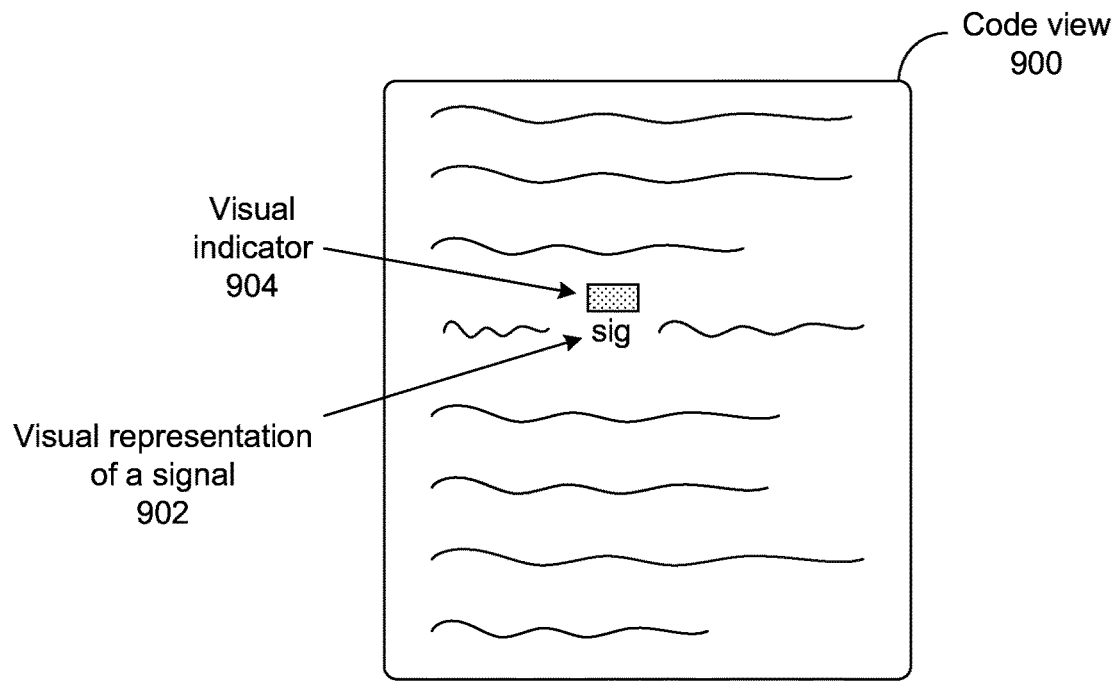
FIGS. 9A-9C illustrate how circuit design views can be annotated to visually convey additional structural information that is not present in the HDL specification in accordance with some embodiments described herein.
Figure 9B:
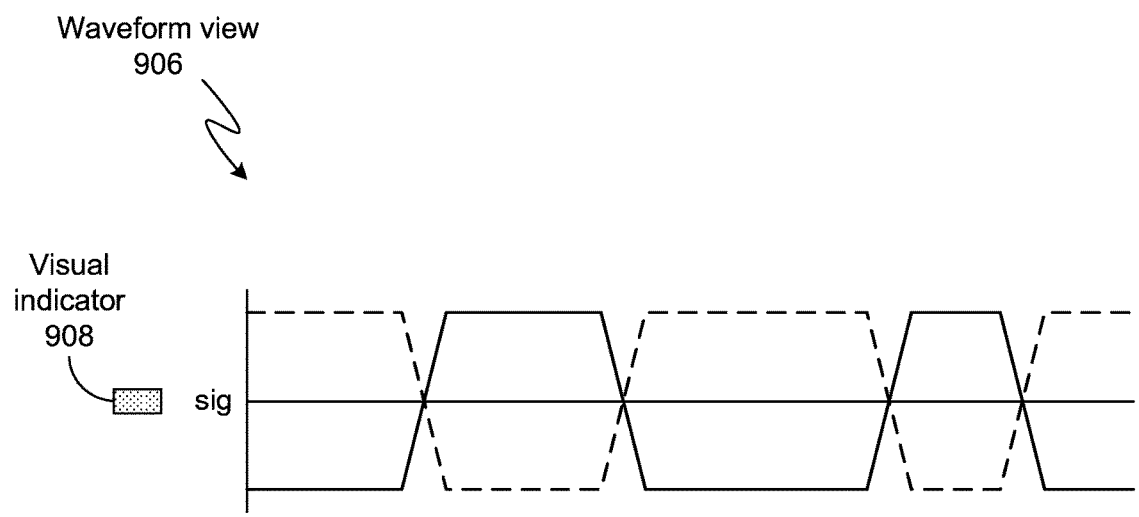
Figure 9C:
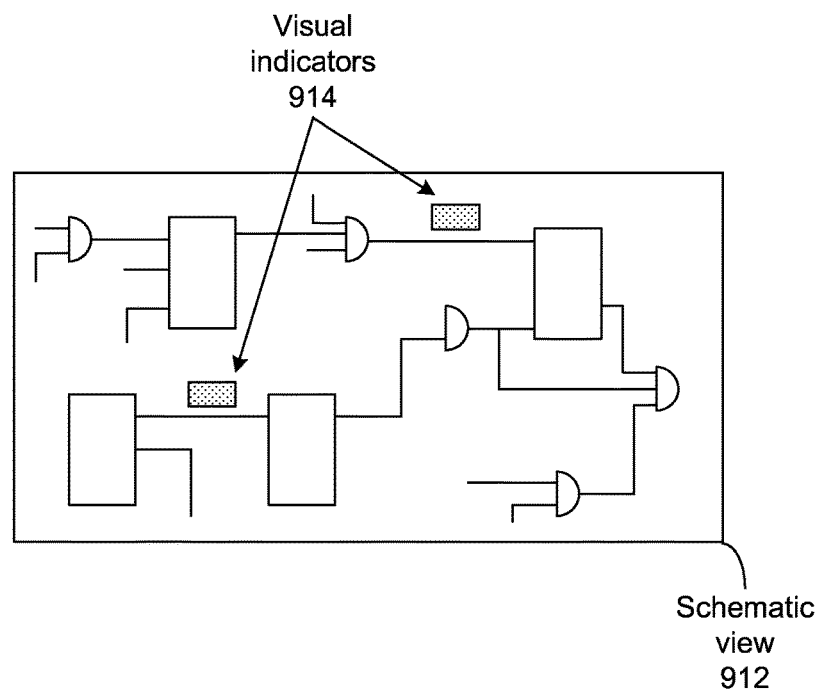

FIGS. 9A-9C illustrate how circuit design views can be annotated to visually convey additional structural information that is not present in the HDL specification in accordance with some embodiments described herein. The wavy lines in code view 900 of FIG. 9A represent lines of HDL code that include structural information of the circuit design. The HDL code includes visual representation of a signal 902 (i.e., the signal name "sig"), and visual indicator 904 that conveys additional structure information that was not present in the HDL specification and that corresponds to the signal called "sig" as shown in FIG. 9A. Likewise, FIG. 9B illustrates waveform view 906 in which visual indicator 908 can be added in proximity to the signal name "sig" to convey additional structural information that is not present in the HDL code and that corresponds to the signal "sig." Finally, FIG. 9C illustrates schematic view 912 that illustrates how visual indicators 914 can be added to convey additional structural information that is not present in the HDL code and that corresponds to signals in the circuit design.

As a specific example, consider level shifters that convert signal voltage levels from one voltage level to another. Level shifters are required when a signal crosses between two power domains that operate at different voltages. Just like isolation cells, level shifters may not be specified in the HDL code. Level shifters may be added to the circuit design based on the power domain specification which may be provided separately from the HDL code (e.g., the files that include HDL code may be different from the files that include power domain specification). Information about the connectivity between a signal and a level shifter and the state of the level shifter can be visually conveyed in a manner that is similar to the manner in which this information was conveyed for isolation cells. For example, the processes illustrated in FIGS. 8A-8C can also be used for annotating signals with level shifter information. Visual indicator 904 in FIG. 9A, visual indicator 908 in FIG. 9B, and visual indicators 914 in FIG. 9C can correspond to level shifters that are added to the circuit design based on the power domain specification.

Circuit Design Displaying System

Figure 10:
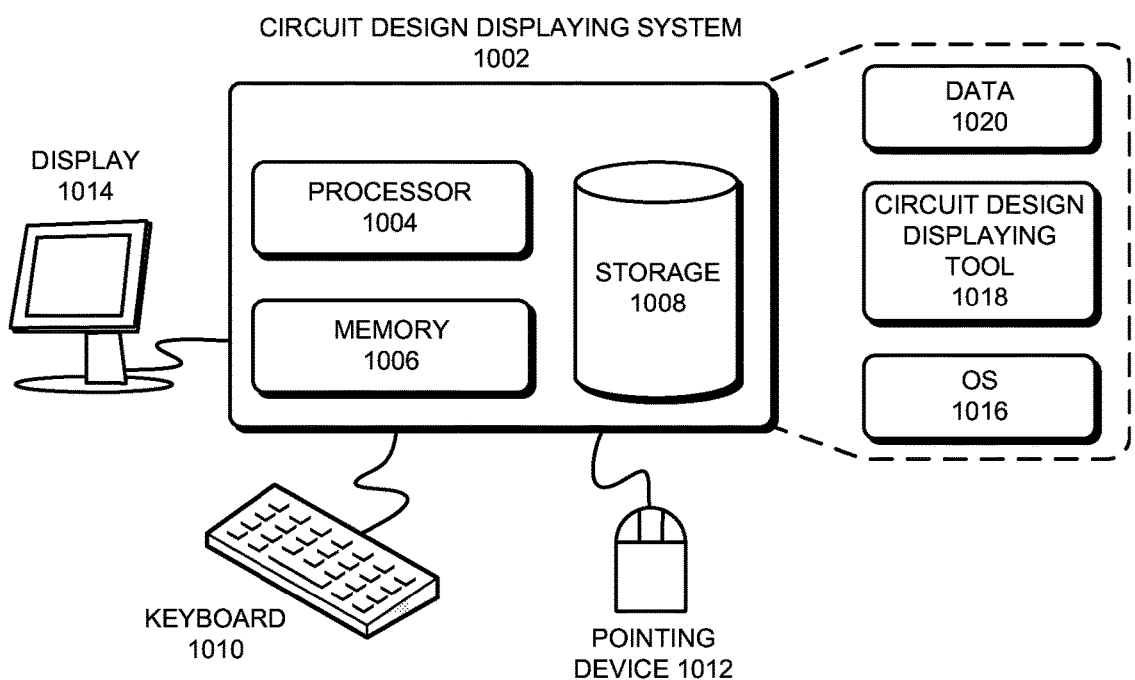
FIG. 10 illustrates a circuit design displaying system in accordance with some embodiments described herein.

The term "circuit design displaying system" refers to a hardware based system that can be used to annotate signals in a circuit design and to display the circuit design with the annotated signals in a display, e.g., in a window of a GUI of an EDA software application executing on a computer. FIG. 10 illustrates a circuit design displaying system in accordance with some embodiments described herein. Circuit design displaying system 1002 can include processor 1004, memory 1006, and storage device 1008. Memory locations in memory 1006 are addressable by processor 1006, thereby enabling processor 1004 to access (e.g., via load/store instructions) and manipulate (e.g., via logical/floating point/arithmetic instructions) the data stored in memory 1006. Circuit design displaying system 1002 can be coupled to display device 1014, keyboard 1010, and pointing device 1012. Storage device 1008 can store operating system 1016, circuit design displaying tool 1018, and data 1020. Data 1020 can include input required by circuit design displaying tool 1018 and/or output generated by circuit design displaying tool 1018.

Circuit design displaying system 1002 may automatically (or with user help) perform one or more operations that are implicitly or explicitly described in this disclosure. For example, circuit design displaying system 1002 can (1) load circuit design displaying tool 1018 into memory 1006, (2) use circuit design displaying tool 1018 to annotate signals in a circuit design view, and (3) display the circuit design view with the annotations in display 1014.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to generate and display an annotated waveform of a signal, the method comprising:
   determining, by using a computer, a correspondence between the signal and an isolation cell, wherein the signal is specified in a hardware description language (HDL) specification of a circuit design, and wherein the isolation cell is specified in a power intent specification of the circuit design;
   generating an annotated waveform of the signal comprising (1) a waveform that represents a variation of the signal with respect to time, and (2) a visual indicator in proximity to the waveform that represents a state of the isolation cell at a selected time instance; and
   displaying the annotated waveform of the signal.

2. The method of claim 1, wherein the HDL specification and the power intent specification are stored in separate files.

3. The method of claim 1, wherein said determining the correspondence comprises:
   creating a representation of the circuit design based on the HDL specification;
   analyzing the power intent specification to identify the isolation cell in the representation of the circuit design; and
   tracing connectivity in the representation of the circuit design to determine the correspondence between the signal and the isolation cell.

4. A non-transitory computer-readable storage medium storing instructions that, when executed by a computer, cause the computer to perform a method to generate and display an annotated waveform of a signal, the method comprising:
   determining a correspondence between the signal and an isolation cell, wherein the signal is specified in a hardware description language (HDL) specification of a circuit design, and wherein the isolation cell is specified in a power intent specification of the circuit design;
   generating an annotated waveform of the signal comprising (1) a waveform that represents a variation of the signal with respect to time, and (2) a visual indicator in proximity to the waveform that represents a state of the isolation cell at a selected time instance; and
   displaying the annotated waveform of the signal.

5. The non-transitory computer-readable storage medium of claim 4, wherein the HDL specification and the power intent specification are stored in separate files.

6. The non-transitory computer-readable storage medium of claim 4, wherein said determining the correspondence comprises:

creating a representation of the circuit design based on the HDL specification;

analyzing the power intent specification to identify the isolation cell in the representation of the circuit design; and tracing connectivity in the representation of the circuit design to determine the correspondence between signal and the isolation cell.

7. An apparatus, comprising:

a processor; and a non-transitory computer-readable storage medium storing instructions that, when executed by the processor, cause the apparatus to perform a method to generate and display an annotated waveform of a signal, the method comprising:

determining a correspondence between the signal and an isolation cell, wherein the signal is specified in a hardware description language (HDL) specification of a circuit design, and wherein the isolation cell is specified in a power intent specification of the circuit design;

generating an annotated waveform of the signal comprising (1) a waveform that represents a variation of the signal with respect to time, and (2) a visual indicator in proximity to the waveform that represents a state of the isolation cell at a selected time instance; and displaying the annotated waveform of the signal.

8. The apparatus of claim 7, wherein the HDL specification and the power intent specification are stored in separate files.

9. The apparatus of claim 7, wherein said determining the correspondence comprises:

creating a representation of the circuit design based on the HDL specification;

analyzing the power intent specification to identify the isolation cell in the representation of the circuit design; and tracing connectivity in the representation of the circuit design to determine the correspondence between the signal and the isolation cell.

* * * * *